Oct. 6, 1931.  A. E. HIESER ET AL  1,825,866
FISHING REEL
Filed June 15, 1929
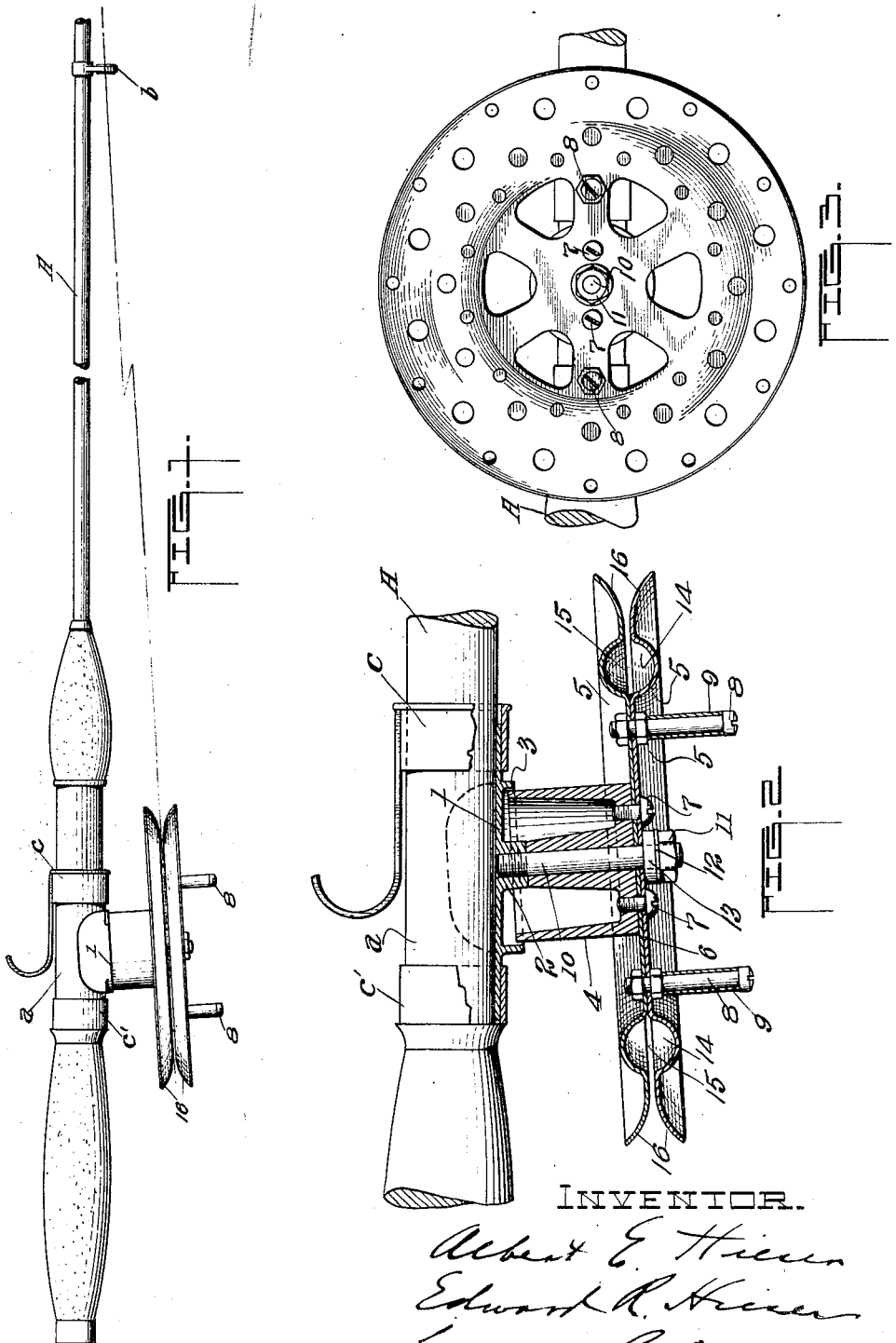
INVENTOR.
Albert E. Hieser
Edward R. Hieser
LaPorte & LaPorte ATTY'S Patented Oct. 6, 1931

1,825,866

UNITED STATES PATENT OFFICE

ALBERT E. HIESER AND EDWARD R. HIESER, OF PEKIN, ILLINOIS

FISHING REEL

Application filed June 15, 1929. Serial No. 371,160.

This invention has reference to certain new and useful improvements in fishing reels and it has for its principal object to provide a reel, the body of which is composed of a pair of correspondingly shaped disk-like members having outwardly flared peripherial portions providing an annular throat, and each member formed with corresponding annular semicircular seats which coact to provide a well for the reception of the line and said well in communication with said throat; the said members coincident with the well and said throat being spaced apart only sufficiently for the passage of a single strand of a line therebetween.

The invention has for a further object to shape the disk-like members whereby their body portions within the circumference of the well portion are joined in abutting relation and from the well portion to their peripheries the bodies of said members have a spaced relation for the entrance into the well portion and extraction therefrom of a single strand of a line at a time, thereby preventing snarling of the line when casting and when reeling.

The invention comprehends improved manner of mounting or attaching the reel to a fishing rod and to an improved brake-drum for the said reel.

The invention further comprehends making the disk-like members of sheet metal, the bodies of which are provided with openings to facilitate the passage of air to the line for drying and emission of moisture, as well as for lightness in the weight of the reel and the annular seats forming the well may be pressed or spun in the sheet.

Other and further objects will appear from the description.

That the invention may be more fully understood, reference is had to the accompanying drawings forming part of the description, illustrating a preferred embodiment of the invention, in which:—

Fig. 1 is a conventional showing of a fishing rod, broken away, and with our improved reel attached thereto;

Fig. 2 is an enlarged sectional view through the reel and clip for attaching the same to the rod, part of the rod being shown to illustrate the manner of attaching the reel to the rod, and Fig. 3 is a face view of the reel.

Like characters of reference denote corresponding parts throughout the figures.

In the drawings the rod A is of the conventional type, having a reel seat $a$ and the usual line guide $b$. At the reel seat there are provided the movable and immovable rings $c$ and $c'$ for securing the clip-member 1 of the reel to the rod, in the usual manner, see Fig. 2.

The clip-member is formed or provided with a threaded boss 2 and with a flanged seat 3 encircling the same which is adapted to receive the inner end of a brake drum 4 secured to and forming a part of the reel proper.

The reel itself, comprises a pair of correspondingly shaped disk-like members 5, the main body portions of which are substantially flat, as at 6, and placed in juxtaposition and secured together by screws 7 which are also employed to secure the brake-drum 4 axially to the body of the reel and further by means of stems 8 carrying sleeves 9 which function as cranks by means of which the reel may be rotated. The reel proper and drum are rotatable on a spindle 10 which passes axially through the body of the reel and threaded into the boss 2 of the clip member 1. A nut 11 acting against a metal washer 12 and it in turn acting against a felt washer 13 provides a simple means of tightening or loosening the reel on its spindle 10, as will be understood.

The disk-like members are each formed by pressing or spinning, with annular semi-circular seats 14 which coact to provide an annular well 15, the base of the well being the united substantially flat body portions of said disk-like members and from this point to the peripheries of the said members they are spaced apart only substantially the thickness of a line and from the well to the peripheries of the said disk-like members their bodies are flared outwardly, as at 16, to provide a throat therebetween for the free entrance and withdrawal of a line. By spacing the disk-like members apart only the single thickness of a line, at points coincident with the well and flared portions thereof, only a single strand of the line may unwind or be wound at a time, and snarling of the line when casting or when reeling is prevented.

The flat body portions 6 of the disk-like members are of open work formation to lighten the structure, while at the same time making it sufficiently rigid, and the walls of the well and flared portions of the said members are provided with perforations for the circulation of air through the well portions to facilitate drying of the line, if wound wet, and for the emission of moisture from the wet line, so wound.

The reel described is of very simple construction, being made of the least number of parts and yet sufficiently rigid to stand the wear and tear to which devices of this character are subjected, and the mounting is simple, including therein a brake-drum with provision for tightening or loosening, as occasion may demand. The arrangement and construction of the well to receive the line together with the throat and narrow passage therebetween and the well insures that when casting or when reeling only a single strand of the line may leave or enter the well at a time and snarling of the line entirely obviated.

What we claim is:—

1. A fishing reel comprising a body made of separable disk-like members, means to secure said members together, each of the said members provided with corresponding annular seats spaced inwardly from their peripheries which coact to provide a well, and the matching faces of said members at said well and from there to their peripheries being spaced apart substantially the thickness of a fishing line, and the peripherial portions of the members being flared outwardly to provide a circumferential throat in communication with the said well.

2. A fishing reel comprising a body made of separable disk-like members, means to secure said members together, each of the said members provided with corresponding annular seats spaced inwardly from their peripheries which coact to provide a well, and the matching faces of said members at said well and from there to their peripheries being spaced apart to form a throat, said throat at the periphery of the reel being of the width thereof and being restricted at the well to the substantial width of a fishing line, and means to rotatably mount said reel on a fishing rod including a breaking means.

In witness whereof, we have hereunto affixed our hands this 12th day of June, 1929.

ALBERT E. HIESER.
EDWARD R. HIESER.